UNITED STATES PATENT OFFICE.

DECIUS W. CLARK, OF PHILADELPHIA, PENNSYLVANIA.

IMPROVEMENT IN COMPOUNDS FOR ENAMELING BRICKS, &c.

Specification forming part of Letters Patent No. 111,318, dated January 31, 1871; Reissue No. 8,855, dated August 19, 1879; application filed March 17, 1879.

*To all whom it may concern:*

Be it known that I, DECIUS W. CLARK, formerly of the city of Chicago, county of Cook, and State of Illinois, now of the city of Philadelphia, State of Pennsylvania, have invented certain Improved Enameling Compounds, of which the following is a specification.

My invention is an improvement upon the glaze described in Letters Patent issued to me June 7, 1859, and numbered 24,282; and consists, mainly, in adapting such glaze by certain changes in materials, their proportions, and the manner of combining them, so as to produce a true enamel, suitable for building-brick and other articles produced from clay, and for iron and other metallic articles, which enamel is capable of a great variety of colors, able to resist heat, cold, or moisture, and any tendency to oxidization or decay.

When I wish to produce an enamel of a white color, I use eighty parts, by weight, of feldspar; seventy parts of flint or quartz; sixty-five parts of paris-white; fifty parts of oxide of zinc; fifty parts of boracic acid; twelve parts of kaolin or china-clay, or their chemical equivalents.

For the various colors enumerated below I use—

For black, eighty-five parts, by weight, of feldspar; seventy parts of flint or quartz; sixty-five parts of paris-white; fifty parts of oxide of zinc; fifty-four parts of boracic acid; twelve parts of kaolin or china-clay; two parts of black oxide of manganese; one part of black oxide of cobalt.

For blue, eighty parts, by weight, of feldspar; seventy parts of flint or quartz; sixty-five parts of paris-white; fifty-two parts of boracic acid; fifty parts of oxide of zinc; twelve parts of kaolin or china-clay; two parts of black oxide of cobalt.

For yellow, eighty parts, by weight, of feldspar; seventy parts of flint or quartz; sixty-five parts of paris-white; fifty-two parts of boracic acid; fifty parts of oxide of zinc; twelve parts of kaolin or china-clay; two parts of oxide of uranium.

For drab, eighty parts, by weight, of feldspar; seventy parts of flint or quartz; sixty-five parts of paris-white; fifty-five parts of boracic acid; fifty parts of oxide of zinc; twelve parts of kaolin or china-clay; six parts of Brandon mineral paint; one part of potters' blue.

For green, eighty parts, by weight, of feldspar; seventy parts of flint or quartz; sixty-five parts of paris-white; fifty-two and one-half parts of boracic acid; fifty parts of oxide of zinc; sixteen parts of kaolin or china-clay; two and one-half parts of oxide of copper.

For red, eighty parts, by weight, of feldspar; seventy parts of flint or quartz; sixty-five parts of paris-white; fifty-two and one-half parts of boracic acid; fifty parts of oxide of zinc; eight parts of kaolin or china-clay; four parts of lime; two and one-half parts of suboxide of copper.

For brown-stone, red sandstone, and various other colors, variable proportions of these several mixtures may be used, as desired, and the proportions may also be varied.

It is to be observed that the various proportions of the different ingredients may be slightly changed, as experience may dictate, in consequence of the variety in the constituent parts of various clays, some clays having more oxide of iron and more lime than other clays.

The method of using these various elements to produce the desired results is to combine all the several ingredients for any special color together in a crucible or retort and calcine them together, not separately, if the best results are desired. Then reduce the mass, in a mill or under the muller or pestle, with water to about the consistency of cream, or to such a degree as to be easily and smoothly spread over the surface to be treated. The articles are then coated, either by brushes or immersion, and then raised to a sufficient temperature in suitable well-known appliances to fuse the enameling compound.

I claim as my invention—

1. A white enameling compound for building-bricks and other articles produced from clay, and for iron and other metallic articles, compounded of the ingredients substantially in the proportions and manner described, and applied substantially as set forth.

2. Colored enameling compounds for building-bricks or other articles produced from clay, and for iron and other metallic articles, compounded of the ingredients substantially in the proportions and manner described, and applied substantially as set forth.

3. As a new article of manufacture, bricks, pottery, or metallic articles having an enameled surface or surfaces prepared of the ingredients substantially in the proportions and manner described, and applied substantially as set forth.

DECIUS W. CLARK.

Witnesses:
R. N. DYER,
JAS. A. PAYNE.